(12) United States Patent
Bunker et al.

(10) Patent No.: US 10,132,166 B2
(45) Date of Patent: Nov. 20, 2018

(54) ENGINE COMPONENT

(71) Applicant: General Electric Company, Schenectady, NY (US)

(72) Inventors: Ronald Scott Bunker, West Chester, OH (US); Robert David Briggs, West Chester, OH (US)

(73) Assignee: General Electric Company, Schenectady, NY (US)

( * ) Notice: Subject to any disclaimer, the term of this patent is extended or adjusted under 35 U.S.C. 154(b) by 483 days.

(21) Appl. No.: 14/633,167

(22) Filed: Feb. 27, 2015

(65) Prior Publication Data

US 2016/0251966 A1     Sep. 1, 2016

(51) Int. Cl.
| | |
|---|---|
| F01D 5/18 | (2006.01) |
| F01D 5/14 | (2006.01) |
| F23R 3/00 | (2006.01) |
| F01D 9/06 | (2006.01) |
| F01D 9/02 | (2006.01) |
| F23R 3/50 | (2006.01) |

(52) U.S. Cl.
CPC ............. *F01D 5/186* (2013.01); *F01D 5/145* (2013.01); *F01D 9/065* (2013.01); *F23R 3/002* (2013.01); *F01D 9/023* (2013.01); *F05D 2240/11* (2013.01); *F05D 2240/81* (2013.01); *F05D 2250/21* (2013.01); *F05D 2250/23* (2013.01); *F05D 2260/202* (2013.01); *F23R 3/50* (2013.01); *F23R 2900/03042* (2013.01); *Y02T 50/672* (2013.01); *Y02T 50/673* (2013.01); *Y02T 50/676* (2013.01)

(58) Field of Classification Search
CPC .......... F01D 5/186; F01D 5/145; F01D 9/065; F01D 9/023; F05D 2240/11; F05D 2240/81; F05D 2250/21; F05D 2250/23; F05D 2260/202; Y10T 50/672; Y10T 50/673; Y10T 50/676; F23R 3/002; F23R 2900/03042
See application file for complete search history.

(56) References Cited

U.S. PATENT DOCUMENTS 3,741,285 A * 6/1973 Kuethe .................. B64C 21/10
165/109.1
5,577,889 A   11/1996 Terazaki et al.
(Continued)

FOREIGN PATENT DOCUMENTS

| EP | 1686240 A1 * | 8/2006 | ............. F01D 5/186 |
| EP | 1930546 A2 | 6/2008 | |

(Continued)

OTHER PUBLICATIONS

Description JP201220280, retrieved May 11, 2017, EPO.*
(Continued)

*Primary Examiner* — Woody Lee, Jr.
*Assistant Examiner* — Jesse Prager
(74) *Attorney, Agent, or Firm* — General Electric Company; William Andes

(57) ABSTRACT

An engine component for a gas turbine engine includes a film-cooled substrate having a hot surface facing hot combustion gas flow and a cooling surface facing a cooling fluid flow. A film hole extends through the substrate to an outlet on the hot surface. A flow conditioning structure is provided upstream of the outlet.

10 Claims, 7 Drawing Sheets

(56) References Cited

U.S. PATENT DOCUMENTS

| | | |
|---|---|---|
| 5,651,662 A | 7/1997 | Lee et al. |
| 6,092,982 A | 7/2000 | Ikeda et al. |
| 6,383,602 B1 | 5/2002 | Fric et al. |
| 6,547,524 B2 | 4/2003 | Kohli et al. |
| 7,553,534 B2 | 6/2009 | Bunker |
| 8,057,179 B1 | 11/2011 | Liang |
| 8,689,568 B2 | 4/2014 | Kohli et al. |
| 8,763,402 B2 | 7/2014 | Xu et al. |
| 9,488,057 B2* | 11/2016 | Jeng ................. F01D 5/186 |
| 9,644,903 B1* | 5/2017 | Shyam ............... F28F 23/00 |
| 2004/0265488 A1 | 12/2004 | Hardwicke et al. |
| 2013/0205787 A1 | 8/2013 | Zelesky et al. |
| 2013/0205792 A1 | 8/2013 | Gleiner et al. |
| 2013/0205801 A1 | 8/2013 | Xu et al. |
| 2013/0209233 A1 | 8/2013 | Xu et al. |
| 2013/0209234 A1 | 8/2013 | Xu |
| 2013/0209269 A1 | 8/2013 | Gleiner et al. |
| 2013/0323080 A1 | 12/2013 | Martin et al. |
| 2016/0281511 A1* | 9/2016 | Hille ................. B32B 3/30 |

FOREIGN PATENT DOCUMENTS

| | | | |
|---|---|---|---|
| EP | 2592228 A1 | | 5/2013 |
| EP | 3034782 A1 | | 6/2016 |
| JP | 2012202280 A | * | 10/2012 |
| JP | 2013194713 A | * | 9/2013 |
| JP | 2014214632 A | | 11/2014 |

OTHER PUBLICATIONS

Description JP2014214632A, retrieved May 15, 2017, EPO.*
Description EP1686240A1, retrieved May 15, 2017, EPO.*
EPO, Translation of Description JP2013194713, retrieved Oct. 6, 2017.*
A European Search Report and Opinion issued in connection with related EP Application No. 16156597.3 dated Aug. 2, 2016.
A European Search Report and Opinion issued in connection with corresponding EP Application No. 16155775.6 dated Aug. 5, 2016.
GE Related Case Form.
U.S. Appl. No. 14/633,174, filed Feb. 27, 2015, Ronald Scott Bunker.

* cited by examiner

ENGINE COMPONENT

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Some engine components include film holes that supply a thin layer or film of cooling fluid on a hot surface of the engine component to protect the engine component from hot combustion gas. Typically, cooling is accomplished by ducting cooler air from the high and/or low pressure compressors to the engine components which require film cooling. The cooling air from the compressor is about 500° C. to 700° C. While the compressor air is a high temperature, it is cooler relative to the air that passes through the combustion chamber, which may be around 1000° C. to 2000° C.

A prior art film hole 200 in an engine component 202 is shown in FIGS. 15-16. The engine component 202 includes a hot surface 204 facing a hot combustion gas flow H and a cooling surface 206 facing a cooling fluid flow C. The film hole 200 includes an inlet 208 provided on a cooling surface 206, an outlet 210 provided on the hot surface 204, and a passage 212 connecting the inlet 208 and the outlet 210. During operation, the cooling fluid flow C is supplied out of the film hole 200 at the outlet 210 to create a thin layer or film of cool air on the hot surface 204, protecting it from the hot combustion gas flow H. When the hot combustion gas flow H encounters the cooling fluid flow C, it can create a large horseshoe vortex that wraps around the cooling fluid flow C. The horseshoe vortex can cause excessive mixing of the cooling fluid flow C into the hot combustion gas flow H, which reduces the cooling efficiency of the film hole 200. Excessive penetration of the cooling fluid flow C into the hot combustion gas flow H as the cooling fluid flow C leaves the outlet 94 can result in the cooling fluid flow C being immediately swept away from the hot surface 84 of the substrate 82, which reduces the cooling efficiency of the film hole 90.

BRIEF DESCRIPTION OF THE INVENTION

Embodiments of the invention relate to an engine component for a gas turbine engine, the gas turbine engine generating hot combustion gas flow, having a substrate having a hot surface facing the hot combustion gas flow and a cooling surface facing a cooling fluid flow, the hot combustion gas flow generally defining an upstream direction and a downstream direction relative to the hot surface, a film hole extending through the substrate and having an inlet provided on the cooling surface, an outlet provided on the hot surface, and a passage connecting the inlet and the outlet, and a flow conditioning structure provided upstream of the outlet on the hot surface, wherein the flow conditioning structure is configured to divert at least a portion of the hot combustion gas flow around the cooling fluid flow emerging from the outlet.

DESCRIPTION OF EMBODIMENTS OF THE INVENTION

The described embodiments of the present invention are directed to a film-cooled engine component, particularly in a gas turbine engine. For purposes of illustration, aspects of the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
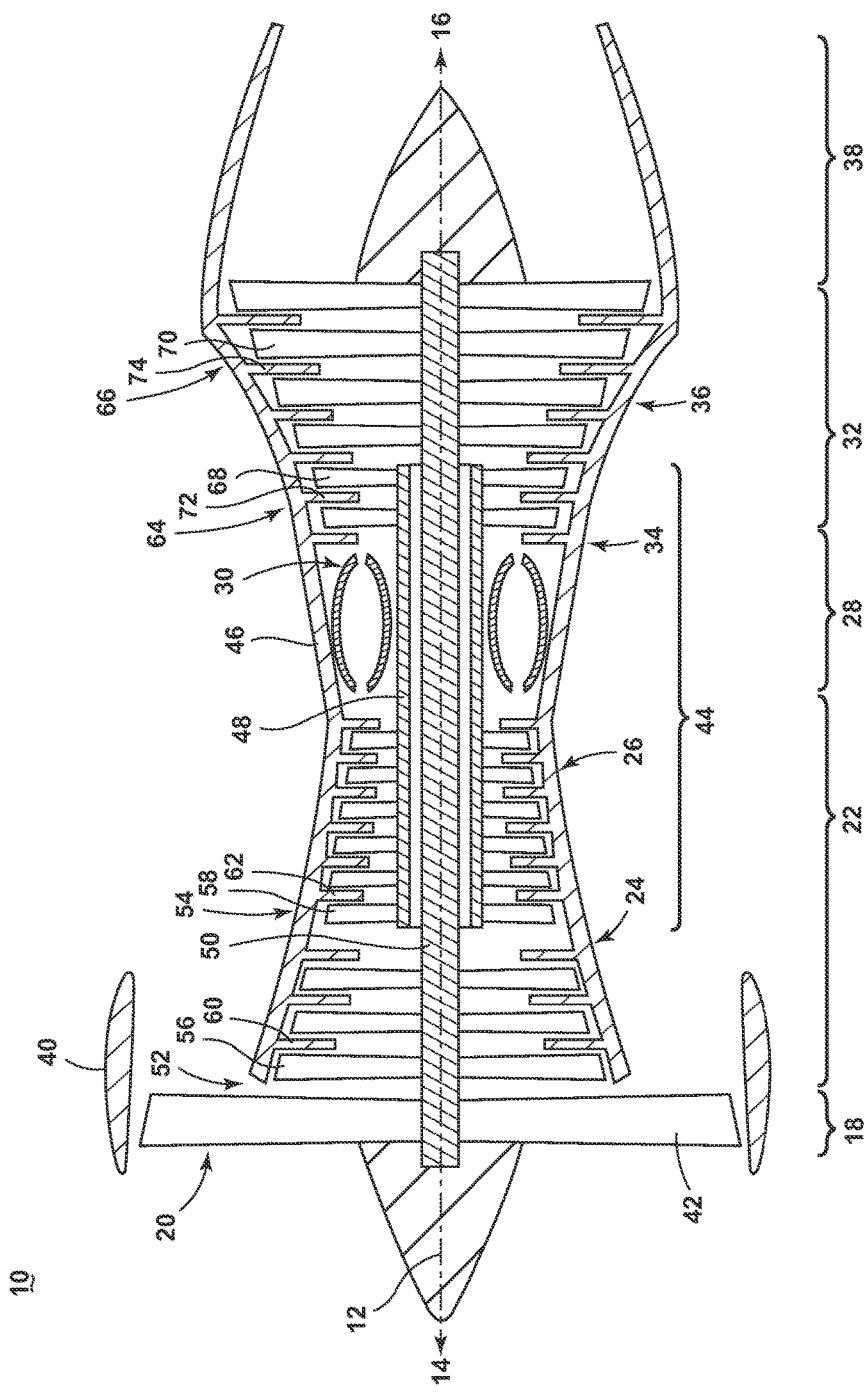
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by a core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
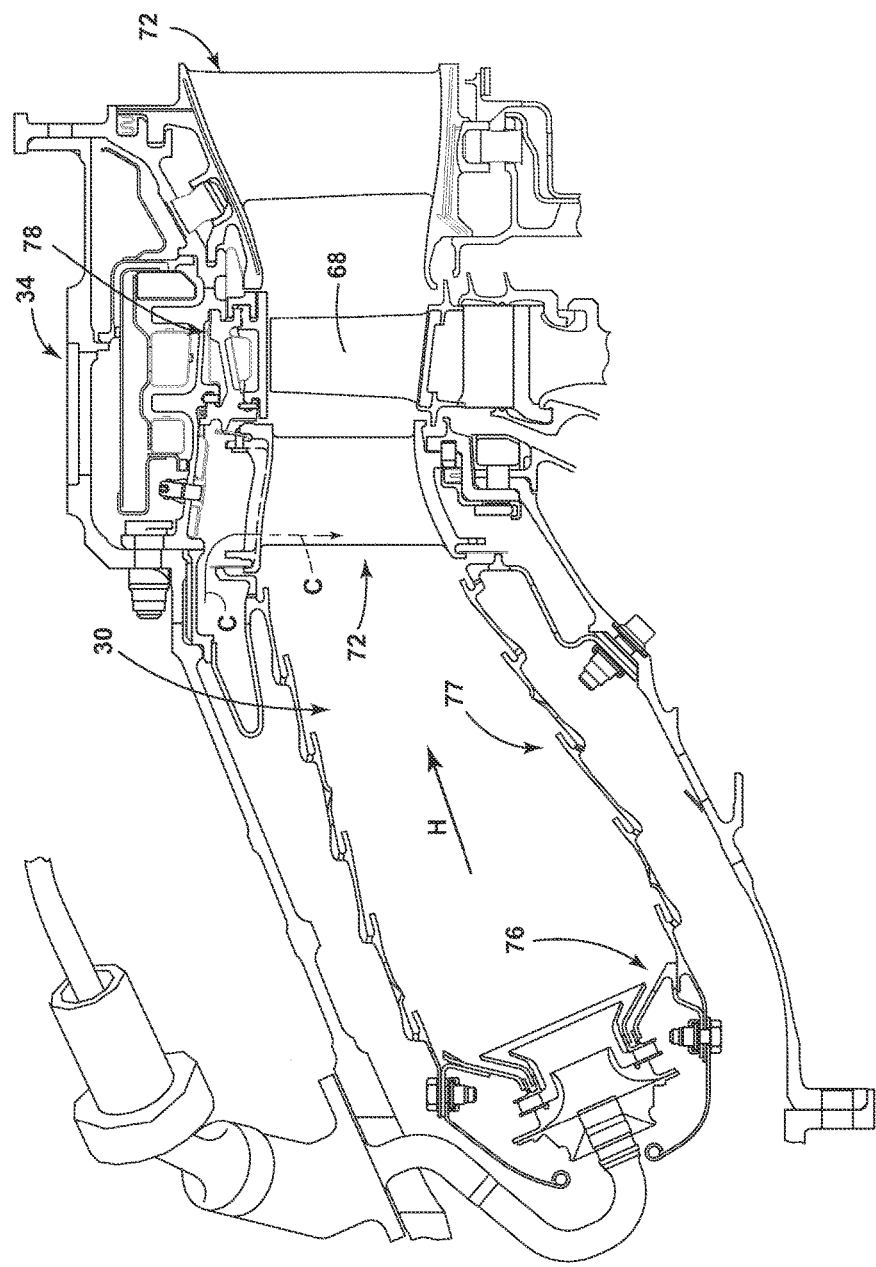
FIG. 2 is a side section view of a combustor and high pressure turbine of the engine from FIG. 1.

FIG. 2 is a side section view of the combustor 30 and HP turbine 34 of the engine 10 from FIG. 1. The combustor 30 includes a deflector 76 and a combustor liner 77. Adjacent to the turbine blade 68 of the turbine 34 in the axial direction are sets of radially-spaced, static turbine vanes 72, with adjacent vanes 72 forming nozzles therebetween. The nozzles turn combustion gas to better flow into the rotating blades so that the maximum energy may be extracted by the turbine 34. A cooling fluid flow C passes through the vanes 72 to cool the vanes 72 as hot combustion gas flow H passes along the exterior of the vanes 72. A shroud assembly 78 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 includes a film-cooled substrate in which a film hole of an embodiment disclosed further herein may be provided. Some non-limiting examples of the engine component having a film-cooled substrate can include the blades 68, 70, vanes or nozzles 72, 74, combustor deflector 76, combustor liner 77, or shroud assembly 78, described in FIGS. 1-2. Other non-limiting examples where film cooling is used include turbine transition ducts and exhaust nozzles.

Figure 3:
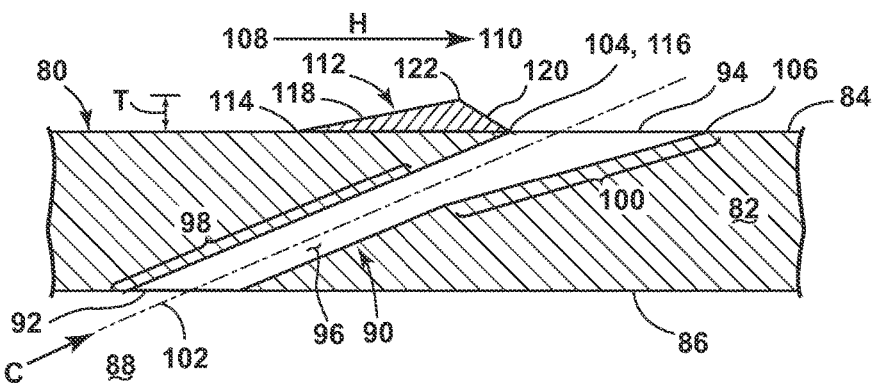
FIG. 3 is a schematic, sectional view through a film hole of an engine component of the engine from FIG. 1 according to a first embodiment of the invention.

FIG. 3 is a schematic, sectional view showing a portion of an engine component 80 according to a first embodiment of the invention. The engine component 80 may be an engine component of the engine 10 from FIG. 1, and can be disposed in a flow of hot gas represented by arrow H. A cooling fluid flow, represented by arrow C may be supplied to cool the engine component. As discussed above with respect to FIGS. 1-2, in the context of a turbine engine, the cooling air can be ambient air supplied by the fan 20 which bypasses the engine core 44, fluid from the LP compressor 24, or fluid from the HP compressor 26.

The engine component 80 includes a substrate 82 having a hot surface 84 facing the hot combustion gas flow H and a cooling surface 86 facing the cooling fluid flow C. The substrate 82 may form a wall of the engine component 80; the wall may be an exterior or interior wall of the engine component 80. The first engine component 80 can define at least one interior cavity 88 comprising the cooling surface 86. The hot surface 84 may be an exterior surface of the engine component 80. In the case of a gas turbine engine, the hot surface 84 may be exposed to gases having temperatures in the range of 1000° C. to 2000° C. Suitable materials for the substrate 82 include, but are not limited to, steel, refractory metals such as titanium, or superalloys based on nickel, cobalt, or iron, and ceramic matrix composites. The superalloys can include those in equi-axed, directionally solidified, and single crystal structures.

The engine component 80 further includes one or more film hole(s) 90 extending through the substrate 82 that provide fluid communication between the interior cavity and the hot surface 84 of the engine component 80. During operation, the cooling fluid flow C is supplied to the interior cavity 88 and out of the film hole 90 to create a thin layer or film of cool air on the hot surface 84, protecting it from the hot combustion gas flow H. While only one film hole 90 is shown in FIG. 3, it is understood that the engine component 80 may be provided with multiple film holes 90, which can be arranged in any desired configuration on the engine component 80.

It is noted that, in any of the embodiments discussed herein, although the substrate 82 is shown as being generally planar, it is understood that that the substrate 82 may be curved for many engine components 80. However, the curvature of the substrate 82 may be slight in comparison to the size of the film hole 90, and so for the purposes of discussion and illustration, the substrate 82 is shown as planar. Whether the substrate 82 is planar or curved local to the film hole 90, the hot and cooling surfaces 84, 86 may be parallel to each other as shown herein, or may lie in non-parallel planes.

The film hole 90 can have an inlet 92 provided on the cooling surface 86 of the substrate 82, an outlet 94 provided on the hot surface 84, and a passage 96 connecting the inlet 92 and the outlet 94. The passage 96 can include a metering section 98 for metering of the mass flow rate of the cooling fluid flow C, and a diffusing section 100 in which the cooling fluid C may expand to form a wider cooling film. The metering section 98 can be a portion of the passage 96 with the smallest cross-sectional area perpendicular to the direction of cooling fluid flow C through the passage 96. The metering section 98 may be a discrete location at which the passage has the smallest cross-sectional area, or an elongated section of the passage 96. The diffusing section 100 is downstream of the metering section 98 with respect to the direction of cooling fluid flow C through the passage 96. The diffusing section 100 may be in serial flow communication with the metering section 98. The metering section 98 can be provided at or near the inlet 92, while the diffusing section 100 can be defined at or near the outlet 94.

An outlet of the metering section 98 is coincident with an inlet to the diffusing section 100, and the coincident outlet and inlet can define a transition between the metering section 98 and the diffusing section 100 where the cooling fluid flow C may begin to expand. In the illustrated embodiment, the metering section 98 is an elongated section of the passage 96, and the transition lies at a distal or downstream end of the metering section 98. In embodiments where the metering section 98 is a discrete location at which the passage 96 has the smallest cross-sectional area, the upstream and downstream ends of the metering section 98 may be coincident, such that the transition and the downstream end of the metering section 98 may be one and the same. It is noted that the transition does not have to lie within a plane. In other cases, there may be more gradual transition between the metering section 98 and the diffusing section 100 that does not lie within a planar section of the passage 96.

The cooling fluid flow C through the passage 96 is along the longitudinal axis of the passage 96, also referred to herein as the centerline 102, which passes through the geometric center of the cross-sectional area of the metering section 98. The film hole 90 can be inclined in a downstream direction of cooling fluid flow C through the passage 96 such that the centerline 102 is non-orthogonal to the hot and cooling surfaces 84, 86. Alternatively, the film hole 90 may have a centerline 102 that is orthogonal to one or both of the hot and cooling surfaces 84, 86 in the localized area of the substrate 82 through which the centerline 102 passes.

The outlet 94 includes an upstream end 104 and a downstream end 106 that can define edges at which the passage 96 intersects the hot surface 84 of the substrate 82. The edges 104, 106 can generally be defined relative to the direction of the hot combustion gas flow H, with the hot combustion gas flow H generally defining an upstream direction 108 and a downstream direction 110 relative to the hot surface 84, i.e. past the outlet 94.

The engine component 80 is further provided with a flow conditioning structure 112 on the hot surface 84 of the substrate 82. The flow conditioning structure 112 is upstream of the outlet 94 and is configured to divert at least a portion of the hot combustion gas flow H around the cooling fluid flow C emerging from the outlet 94. This diversion improves the cooling efficiency of the fluid from the film hole 90 by reducing the interaction of the cooling fluid flow C with the hot combustion gas flow H In the illustrated embodiment, the flow conditioning structure 112 comprises a projection from the hot surface 84. When viewed in cross-section, as in FIG. 3, the projection 112 has an upstream end 114 and a downstream end 116 defining edges that can define edges at which the projection 112 meets the hot surface 84 of the substrate 82 and that are generally defined relative to the direction of the hot combustion gas flow H. The projection 112 can be centered with respect to the centerline 102 of the film hole 90, and may be elongated in the upstream direction 108.

The projection 112 can be immediately adjacent to the outlet 94 such that the projection 112 is contiguous with the outlet 94. Specifically, the downstream edge 116 of the projection 112 may be at least partially shared with the upstream edge 104 of the outlet 94. In other embodiments of the invention, the projection 112 can be separated from the outlet 94 such that the projection 112 is not physically connected with the film hole 90.

The configuration of the projection 112 for diverting the hot combustion gas flow H around the cooling fluid flow C emerging from the outlet 94 may be at least partially defined by the three-dimensional shape of the projection 112, which is in turn defined by the cross-sectional shape and planform of the projection 112. The illustrated projection 112 has a cross-sectional shape that increases in height in the downstream direction 110 toward the outlet 94, such that the projection 112 can act as a ramp for lifting the hot combustion gas flow H away from the hot surface 84 upstream of the outlet 94, thereby diverting it around the outlet 94. The illustrated projection 112 is generally triangular, with an upstream surface 118 that meets the hot surface at the upstream edge 114 and a downstream surface 120 the meets the outlet 94 at the downstream edge 116. Both surfaces 118, 120 extend outwardly from the hot surface 84 and meet at an outward edge 122. Both surfaces 118, 120 can decline from the outward edge 122 toward the hot surface 84, with the downstream surface 120 having a steeper decline and being shorter than the upstream surface 118. Alternatively, the surface 120 can be perpendicular to the hot surface 84 or inclined in the opposite direction from what is illustrated in FIG. 3.

Figure 4:
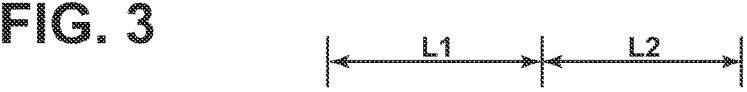
FIG. 4 is a top view of the hot surface of the engine component from FIG. 3.
Figure 4:
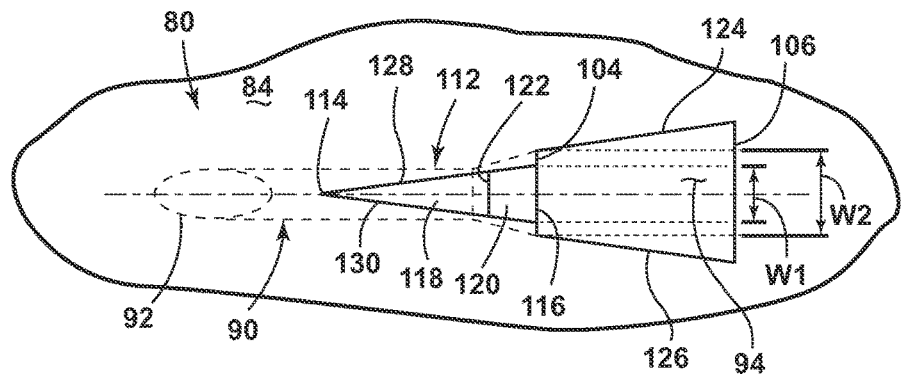
Figure 5:
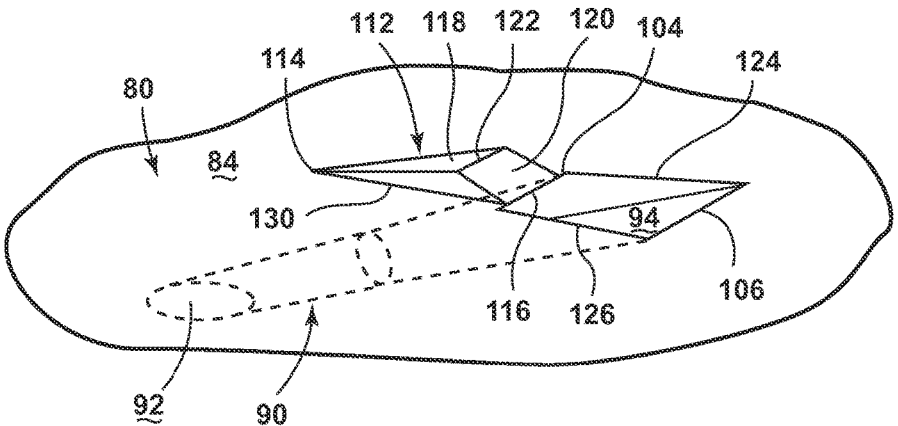
FIG. 5 is a perspective view of the hot surface of the engine component from FIG. 3.

FIGS. 4-5 are top and perspective views of the hot surface 84 of the engine component 80 from FIG. 3. The outlet 94 meets the hot surface 84 at a perimeter which includes the upstream and downstream edges 104, 106 of the outlet 94. The illustrated outlet 94 has a perimeter that is generally rectilinear in shape, with the substantially linear upstream edge 104 being joined with the substantially linear downstream edge 106 by substantially linear side edges 124, 126 that diverge from each other in the downstream direction. The side edges 124, 126 may blend with the upstream and downstream edges 104, 106 as smooth curves rather than a sharp corner or fillet.

The projection 112 also meets the hot surface 84 at a perimeter which includes the upstream and downstream edges 114, 116 of the projection 112. The perimeter generally defines the planform of the projection 112, and the planform of the projection 112 can taper in the upstream direction away from the outlet 94, such that the projection 112 can act a wedge for separating hot combustion gas flow H upstream of the outlet 94 and diverting it around the outlet 94. In the illustrated embodiment, the planform of the projection 112 is generally triangular, and is partially defined by lateral surfaces 128, 130 of the projection 112 which extend from the downstream edge 116 and converge at the upstream edge 114, which meets or blends into the hot surface 84. The lateral surfaces 128, 130 can extend upwardly from the hot surface 84 and meet the upstream and downstream surfaces 118, 120.

It is noted that in some embodiments of the invention, the surfaces 118, 120 128, 130 may blend with the surrounding features, such as the hot surface 84 and/or the outlet 94 in a smooth transition rather than a sharp corner or fillet. Further, the surfaces 118, 120, 128, 130 may be curved or arcuate, rather than linear as illustrated.

It is further noted that, for the film hole 90 illustrated, the projection 112 is substantially axisymmetric about the centerline 102 and centered with respect to the outlet 94. In other embodiments of the invention, the projection 112 may be asymmetric about the centerline 102.

The configuration of the projection 112 for diverting the hot combustion gas flow H around the cooling fluid flow C emerging from the outlet 94 may be at least partially defined by the dimensions of the projection 112 relative to the outlet 94. In one non-limiting example, the maximum width W1 of the projection 112, which is taken generally transverse to the hot combustion gas flow H, can be less than or equal to two times the width W2 of the outlet 94 at its upstream edge 104. As the illustrated projection 112 tapers, the maximum width W1 can be defined at the downstream edge 116. Here, as shown in FIG. 4, the maximum width W1 of the projection 112 is slightly less than the upstream width W2 of the outlet 94. Further, the maximum height T of the projection 112, which is taken generally transverse to the hot surface 84, can be less than or equal to four times the upstream width W2 of the outlet 94. As the illustrated projection 112 tapers, the maximum height T can be defined by the outward edge 122. The maximum length L1 of the projection 112, which is taken generally parallel to the hot combustion gas flow H between the upstream and downstream edges 114, 116, can be less than or equal to three times the length L2 of the outlet 94, taken between the upstream and downstream surfaces 104, 106.

Figure 6:
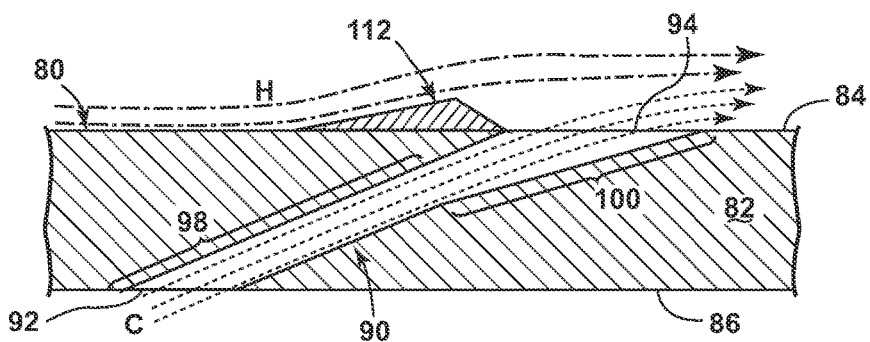
FIGS. 6-8 are views similar to FIGS. 3-5, showing the flow of hot combustion gas and cooling fluid relative to the engine component.
Figure 7:
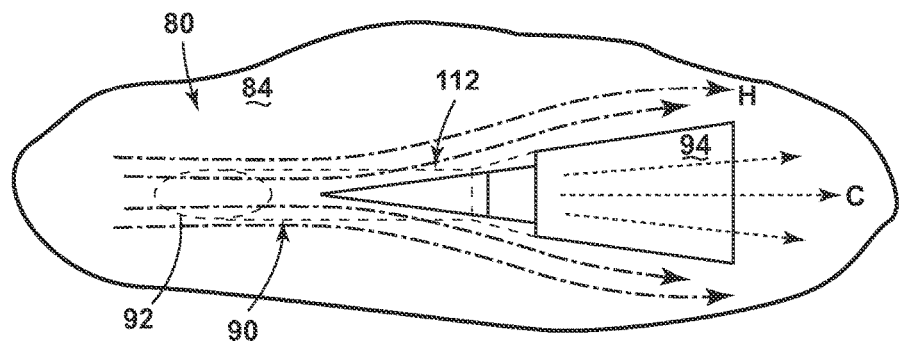
Figure 8:
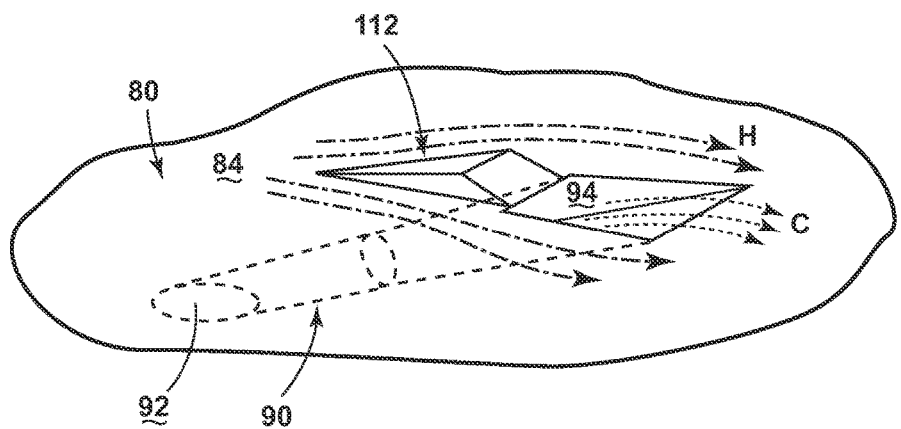
Figure 15:
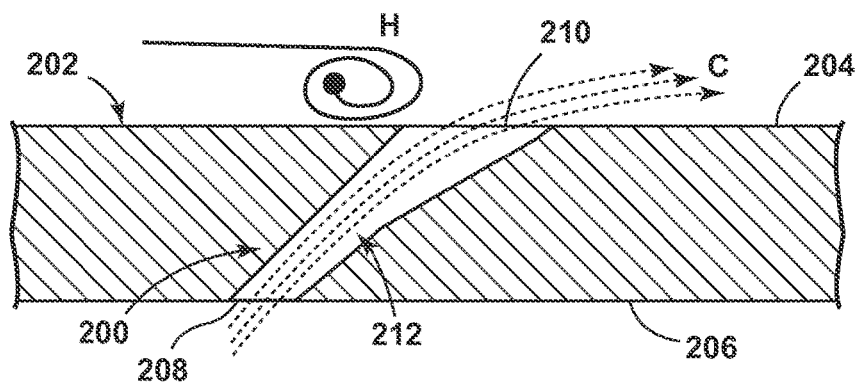
FIG. 15 is a schematic, sectional view through a film hole of an engine component according to the prior art, showing the flow of hot combustion gas and cooling fluid relative to the engine component.
Figure 16:
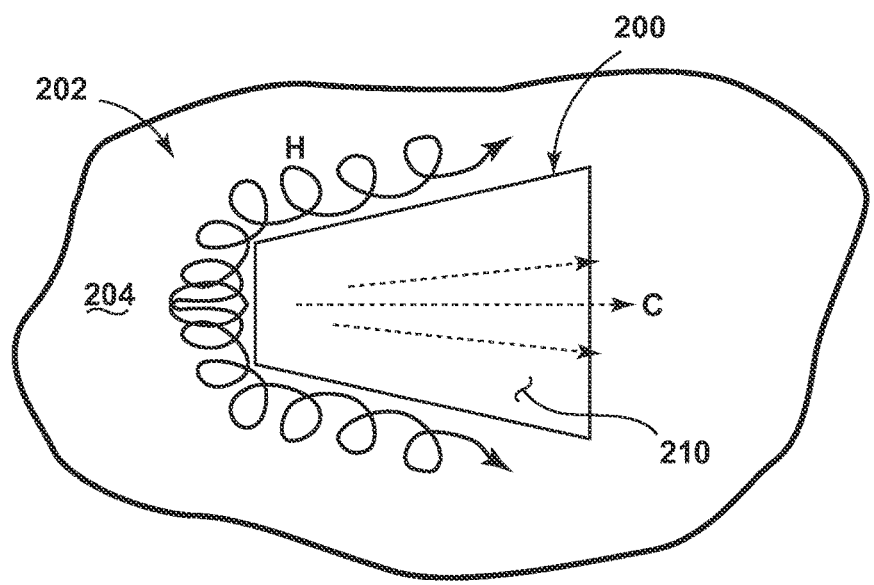
FIG. 16 is a top view of the hot surface of the engine component from FIG. 15, showing the flow of hot combustion gas and cooling fluid relative to the engine component.

FIGS. 6-8 are views similar to FIGS. 3-5, and show the flow of hot combustion gas and cooling fluid relative to the engine component 80. In operation, cooling fluid flow C enters the film hole 90 through the inlet 92 and passes through the metering section 98 and diffusing section 100 before exiting the film hole 90 at the outlet 94 along the hot surface 84. Without the projection 112, as shown in FIGS. 15-16, when the hot combustion gas flow H encounters the cooling fluid flow C, it can create a large horseshoe vortex that wraps around the cooling fluid flow C. The projection 112 diverts at least a portion of the hot combustion gas flow H around the cooling fluid flow C emerging from the outlet 94. Specifically, the projection 112 extending upstream from the outlet 94 acts as a block for the cooling fluid flow C exiting the film hole 90, which reduces the detrimental effects of excessive interaction of the cooling fluid flow C with the hot combustion gas flow H by conditioning the region immediately outside the film hole 90. The projection 112 conditions the hot surface 84 upstream of the outlet 94, wedging the hot combustion gas flow H laterally and outwardly from the hot surface 84 before it reaches the outlet 94 to help the cooling fluid flow C remain attached to the hot surface 84 of the substrate 82 as a film of cooling fluid downstream of the outlet 94 and mix less with the hot combustion gas flow H.

Figure 9:
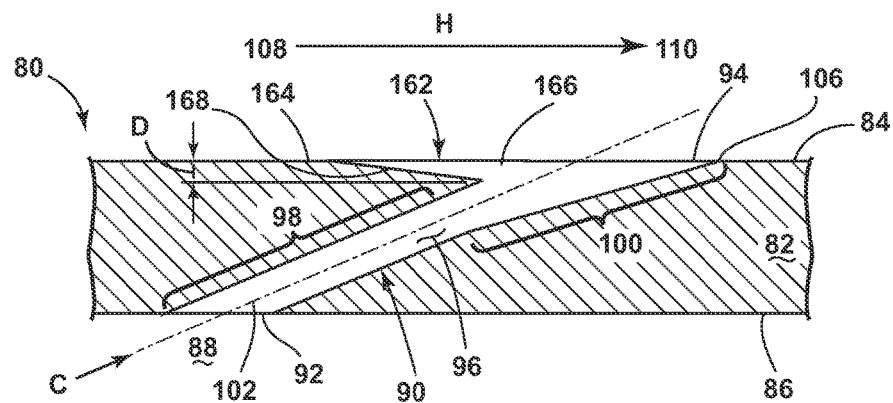
FIG. 9 is a schematic, sectional view through a film hole of an engine component of the engine from FIG. 1 according to a second embodiment of the invention.

FIG. 9 is a schematic, sectional view showing the engine component 80 having a flow conditioning structure according to a second embodiment of the invention. The engine component 80 and the film hole 90 of the engine component 80 are substantially identical to the engine component of the first embodiment, and like elements are indicated by like reference numerals.

The engine component 80 is further provided with a flow conditioning structure 162 on the hot surface 84 of the substrate 82. The flow conditioning structure 162 is upstream of the outlet 94 and is configured to divert at least a portion of the hot combustion gas flow H around the cooling fluid flow C emerging from the outlet 94. This diversion improves the cooling efficiency of the film hole 90 by reducing the interaction of the cooling fluid flow C with the hot combustion gas flow H In the illustrated embodiment, the flow conditioning structure 162 comprises a recess in the hot surface 84. When viewed in cross-section, as in FIG. 9, the recess 162 has an upstream end 164 and a downstream end 166 generally defined relative to the direction of the hot combustion gas flow H. The recess 162 can be centered with respect to the centerline 102 of the film hole 90, and may be elongated in the upstream direction 108.

The recess 162 can be immediately adjacent to the outlet 94 such that the recess 162 is contiguous with the outlet 94. Specifically, the downstream end 166 of the recess 162 may merge with the outlet 94. In other embodiments of the invention, the recess 162 can be separated from the outlet 94 such that the recess 162 is not physically connected with the film hole 90.

The configuration of the recess 162 for diverting the hot combustion gas flow H around the cooling fluid flow C emerging from the outlet 94 may be at least partially defined by the three-dimensional shape of the recess 162, which is in turn defined by the cross-sectional shape and planform of the recess 162. The illustrated recess 162 has a cross-sectional shape that increases in depth in the downstream direction 110 toward the outlet 94. The illustrated recess 162 is generally triangular, with a bottom surface 168 that extends into the hot surface 84 and extends between the upstream end 164 and the downstream end 166. The upstream end 164 can define an upstream edge at which the recess 162 meets the hot surface 84 of the substrate 82. The bottom surface 168 can generally decline from the upstream edge 164 toward the outlet 94.

Figure 10:
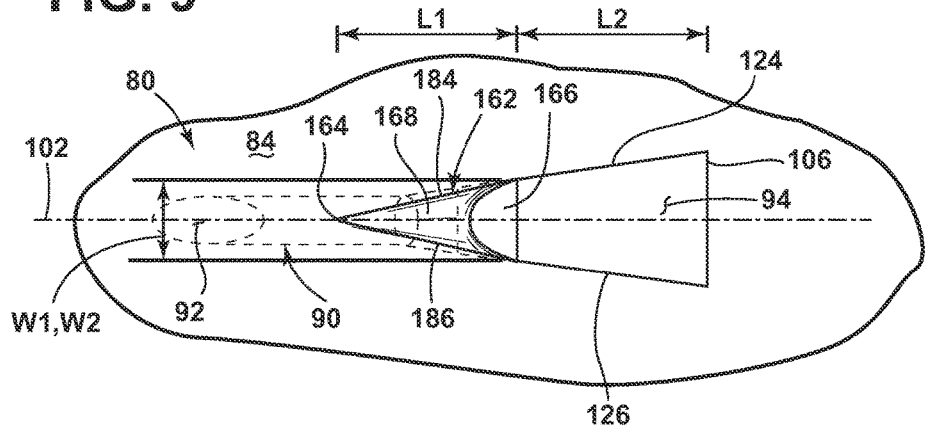
FIG. 10 is a top view of the hot surface of the engine component from FIG. 9.
Figure 11:
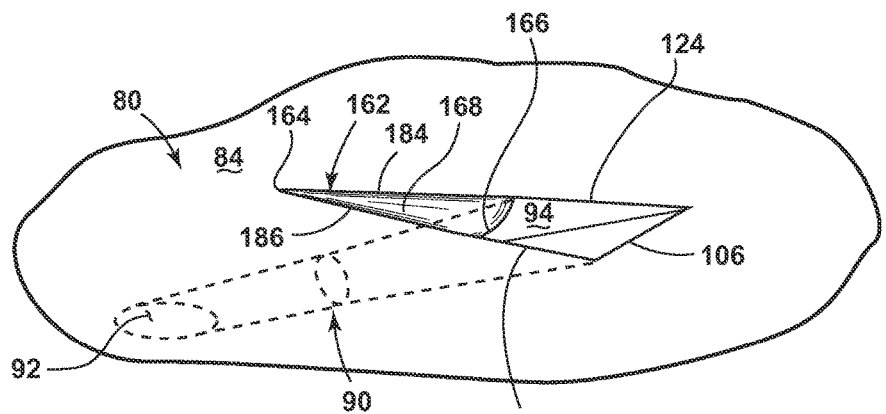
FIG. 11 is a perspective view of the hot surface of the engine component from FIG. 9.

FIGS. 10-11 are top and perspective views of the hot surface 84 of the engine component 80 from FIG. 9. The recess 162 meets the hot surface 84 at a perimeter which includes the upstream and downstream ends 164, 166 of the recess 162. The perimeter generally defines the planform of the recess 162, and the planform of the recess 162 can taper in the upstream direction away from the outlet 94, such that the recess 162 can act as a pocket to divert a portion of hot combustion gas flow H upstream of the outlet 94 and diminish the horseshoe mixing. In the illustrated embodiment, the planform of the recess 162 is generally triangular, and is partially defined by lateral edges 184, 186 of the recess 162 which extend from the downstream end 166 and converge to form the upstream edge 164, which meets or blends into the hot surface 84. The bottom surface 168 can extend from the lateral edges 184, 186 into the hot surface 84.

It is noted that in some embodiments of the invention, the edges 184, 186 of the surface 168 may blend with the surrounding features, such as the hot surface 84 and/or the outlet 94 in a smooth transition rather than a sharp corner or fillet. Further, the edges 184, 186 may be curved or arcuate, rather than linear as illustrated.

It is further noted that, for the film hole 90 illustrated, the recess 162 is substantially axisymmetric about the centerline 102 and centered with respect to the outlet 94. In other embodiments of the invention, the recess 162 may be asymmetric about the centerline 102.

The configuration of the recess 162 for diverting the hot combustion gas flow H around the cooling fluid flow C emerging from the outlet 94 may be at least partially defined by the dimensions of the recess 162 relative to the outlet 94. In one non-limiting example, the maximum width W1 of the recess 162, which is taken generally transverse to the hot combustion gas flow H, can be less than or equal to two times the width W2 of the outlet 94 at its upstream 154. As the illustrated recess 162 tapers, the maximum width W1 can be defined at the downstream edge. Here, as shown in FIG. 10, the maximum width W1 of the recess 162 is equal to the upstream width W2 of the outlet 94. Further, the maximum depth D of the recess 162, which is taken generally transverse to the hot surface 84, can be less than or equal to two times the upstream width W2 of the outlet 94. As the illustrated recess 162 tapers, the maximum depth D can be defined by the maximum distance between the bottom surface 168 and the hot surface 84. The maximum length L1 of the recess 162, which is taken generally parallel to the hot combustion gas flow H between the upstream and downstream ends 164, 166, can be less than or equal to three times the length L2 of the outlet 94, taken between the upstream and downstream surfaces 104, 106.

Figure 12:
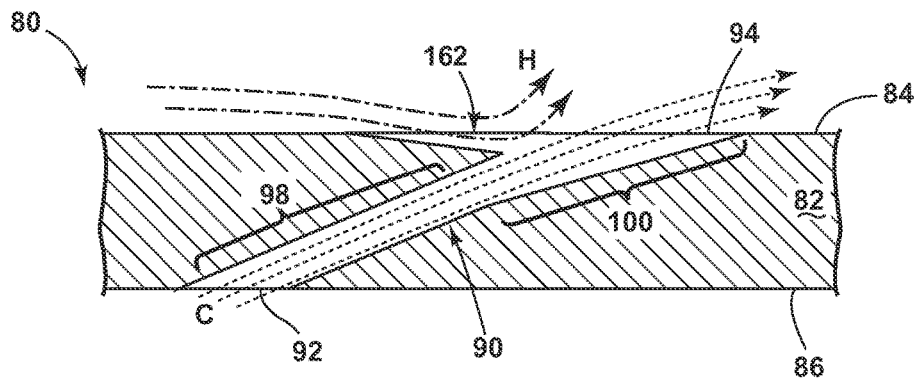
FIGS. 12-14 are views similar to FIGS. 9-11, showing the flow of hot combustion gas and cooling fluid relative to the engine component.
Figure 13:
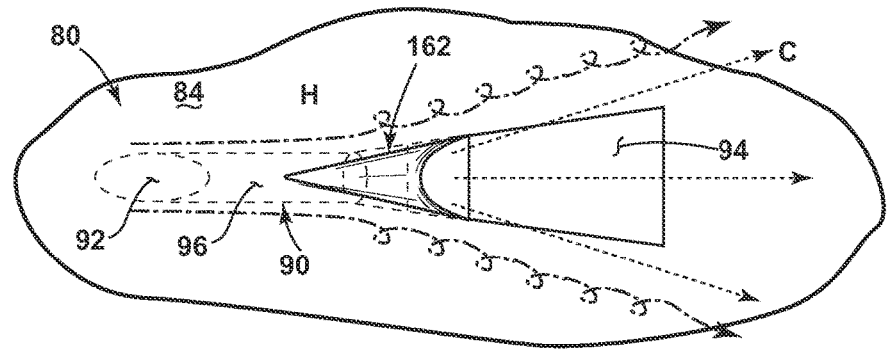
Figure 14:
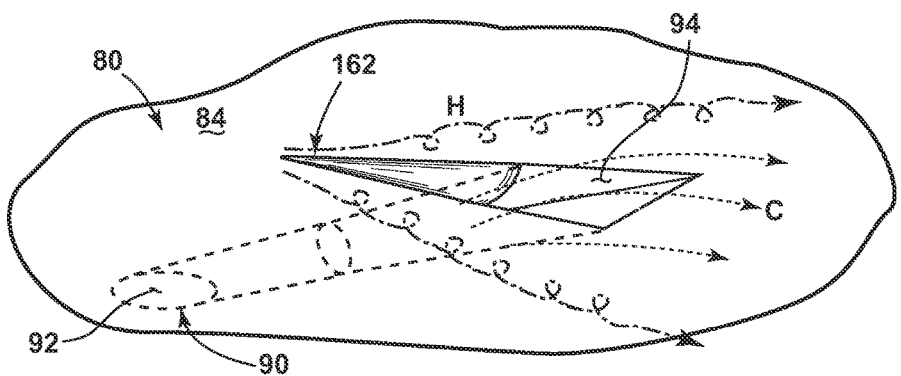

FIGS. 12-14 are views similar to FIGS. 9-11, and show the flow of hot combustion gas and cooling fluid relative to the engine component 80. In operation, cooling fluid flow C enters the film hole 90 through the inlet 92 and passes through the metering section 98 and diffusing section 100 before exiting the film hole 90 at the outlet 94 along the hot surface 84. Without the recess 162, as shown in FIGS. 15-16, when the hot combustion gas flow H encounters the cooling fluid flow C, it can create a large horseshoe vortex that wraps around the cooling fluid flow C. The recess 162 provides a pocket in the hot surface 84 that diverts at least a portion of the hot combustion gas flow H below the plane defined by the hot surface 84. The hot combustion gas flow H that flows into the recess 162 still encounters the cooling fluid flow C emerging from the outlet 94, but the edges of the recess limit the lateral spread of the flow H, preventing the large horseshoe vortex from forming. Instead, the recess 162 conditions the region immediately outside the film hole 90 to yield vortices in the hot combustion gas flow H that mix less with the cooling fluid flow C. The recess 162 conditions the hot surface 84 upstream of the outlet 94 before the hot combustion gas flow H reaches the outlet 94 to help the cooling fluid flow C remain attached to the hot surface 84 of the substrate 82 as a film of cooling fluid downstream of the outlet 94 and mix less with the hot combustion gas flow H.

In any of the above embodiments, the present invention may be combined with shaping or contouring of the metering section and/or diffusing section of the film hole 90. Embodiments of the present invention may also be applied to film holes without a diffusing section. Embodiments of the present invention may also apply to slot-type film cooling, in which case the outlet 94 is provided within a slot on the hot surface 84. Further, in any of the above embodiments, a coating can be applied to the hot surface 84 of the substrate 82. Some non-limiting examples of coatings include a thermal barrier coating, an oxidation protection coating, or combinations thereof.

The various embodiments of devices and methods related to the invention disclosed herein provide improved cooling for engine structures, particularly in a turbine component having film holes. One advantage that may be realized in the practice of some embodiments of the described systems is that a flow conditioning structure can be provided upstream of the film hole outlet in order to condition the cooling fluid flow emerging from the outlet so as to divert the hot combustion gas flow around the cooling fluid flow emerging from the outlet, thereby improving cooling efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a gas turbine engine, the gas turbine engine generating hot combustion gas flow, comprising:
   a substrate having a hot surface facing the hot combustion gas flow and a cooling surface facing a cooling fluid flow, the hot combustion gas flow generally defining an upstream direction and a downstream direction relative to the hot surface;
   a film hole extending through the substrate and having an inlet provided on the cooling surface, an outlet provided on the hot surface, and a passage connecting the inlet and the outlet; and
   a flow conditioning structure provided upstream of the outlet on the hot surface, the flow conditioning structure further comprising;
   a triangular planform comprising a first lateral surface and a second lateral surface, the first lateral surface and second lateral surface extending upstream from the film hole and converging at a flow conditioning structure upstream end,
   wherein the first lateral surface and second lateral surface define a lateral width of the flow conditioning structure,
   wherein the lateral width of the flow conditioning structure increases continuously from the flow conditioning structure upstream end to the film hole outlet, and wherein the flow conditioning structure is configured to divert at least a portion of the hot combustion gas flow around the cooling fluid flow emerging from the outlet,
   wherein the flow conditioning structure comprises a projection from the hot surface,
   wherein the projection is immediately adjacent to the outlet,
   wherein the projection further comprises a first outwardly extending surface and a second outwardly extending surface, the first outwardly extending surface and the second outwardly extending surface meeting at an outward edge, the first outwardly extending surface inclining from the flow conditioning structure upstream end to the outward edge, and the second outwardly extending surface declining from the outward edge to the film hole outlet,
   wherein the second outwardly extending surface has a steeper decline than the first outwardly extending surface,
   wherein the second outwardly extending surface is shorter than the first outwardly extending surface,
   wherein the passage comprises a metering section defining the inlet and a diffusing section defining the outlet, wherein a portion of the perimeter of the outlet defined by the diffusing section is contiguous with a portion of the flow conditioning structure, and wherein the flow conditioning structure blends into the hot surface at both the flow conditioning structure upstream end and the flow conditioning structure downstream end.

2. The engine component of claim 1, wherein the lateral width of the flow conditioning structure has a maximum width less than or equal to two times an upstream width of the film hole outlet.

3. The engine component of claim 2, wherein a maximum length of the flow conditioning structure is less than or equal to three times the length of the film hole outlet.

4. The engine component of claim 1, and wherein a maximum height of the projection is less than or equal to four times an upstream width of the film hole outlet.

5. The engine component of claim 1, wherein the passage defines a centerline that is inclined in the downstream direction such that the centerline is non-orthogonal to the cooling surface and the hot surface, wherein the first outwardly extending surface is triangular, and wherein the second outwardly extending surface is trapezoidal.

6. The engine component of claim 1, wherein the engine component comprises one of a blade, a vane, a shroud, or a combustor liner, wherein the maximum width of the flow conditioning structure is less than the minimum width of the outlet.

7. The engine component of claim 5, wherein the substrate comprises an exterior wall of the engine component which defines an interior to which the cooling fluid flow is supplied, and wherein the maximum width of the flow conditioning structure is less than the minimum width of the outlet.

8. An engine component for a gas turbine engine, the gas turbine engine generating hot combustion gas flow, comprising:

a substrate having a hot surface facing the hot combustion gas flow and a cooling surface facing a cooling fluid flow, the hot combustion gas flow generally defining an upstream direction and a downstream direction relative to the hot surface;

a film hole extending through the substrate and having an inlet provided on the cooling surface, an outlet provided on the hot surface, and a passage connecting the inlet and the outlet; and a flow conditioning structure comprising a projection from the hot surface provided upstream of the outlet on the hot surface, the flow conditioning structure further comprising;

a triangular planform comprising a first lateral surface and a second lateral surface, the first lateral surface and second lateral surface extending upstream from the film hole and converging at a flow conditioning structure upstream end, wherein the first lateral surface and second lateral surface define a lateral width of the flow conditioning structure, wherein the lateral width of the flow conditioning structure increases continuously from the flow conditioning structure upstream end to the film hole outlet, wherein the flow conditioning structure is configured to divert at least a portion of the hot combustion gas flow around the cooling fluid flow emerging from the outlet, and wherein the maximum width of the flow conditioning structure is less than the minimum width of the outlet.

9. The engine component of claim 8, wherein the projection is tapered in the upstream direction away from the outlet.

10. The engine component of claim 9, wherein the projection is immediately adjacent to the outlet.

* * * * *